United States Patent [19]

Raivola et al.

[11] 4,359,678
[45] Nov. 16, 1982

[54] ELECTRONIC REACTIVE POWER REGULATOR

[76] Inventors: Pertti Raivola, Peltokatu 25 C 45, SF-33100 Tampere 10; Bo Wikstroom, Voiomaankatu 26 as. 26, SF-33300 Tampere 30, both of Finland; Pellervo Kaskinen, 189 Wallace Rd., Nashville, Tenn. 37211

[21] Appl. No.: 137,761

[22] Filed: Apr. 7, 1980

[51] Int. Cl.³ .............................. G05F 1/70; H02J 3/18
[52] U.S. Cl. .................................................... 323/211
[58] Field of Search ............... 323/102, 105, 119, 124, 323/127, 128, 205, 208–211; 328/155

[56] References Cited

U.S. PATENT DOCUMENTS

| | | | |
|---|---|---|---|
| 2,460,467 | 2/1949 | Nelson et al. | 323/105 |
| 3,185,811 | 5/1965 | Kasper et al. | 323/128 X |
| 3,300,712 | 1/1967 | Segsworth | 323/105 |
| 3,391,329 | 7/1968 | Meyer | 323/105 X |
| 3,424,971 | 1/1969 | Stackegard | 323/102 X |
| 3,921,070 | 11/1975 | Ringstad et al. | 323/102 X |

FOREIGN PATENT DOCUMENTS

2150281 4/1973 Fed. Rep. of Germany .

*Primary Examiner*—William M. Shoop

[57] ABSTRACT

An electronic reactive power regulator is provided for controlling the number of power factor correction capacitors or reactors connected to an electrical power network. A multiplier circuit measures the reactive power in the power network by receiving two input signals which vary in phase angle and amplitude to indicate the amount of reactive power. The multiplier outputs a signal whose DC component indicates the amount of reactive power. This DC component is compared to upper and lower reference limits, and if either of said limits is exceeded, one of two control signals triggers a logic circuit to selectively connect or disconnect the lowest value correction capacitor to the electrical network which is not already connected or disconnected.

35 Claims, 5 Drawing Figures

FIG. 2B.

ELECTRONIC REACTIVE POWER REGULATOR

DESCRIPTION

Technical Field

This invention relates to an apparatus for controlling the amount of reactive power in electrical power networks.

Background of the Invention

In electrical power networks, both real power and reactive power is needed to energize cables, switch gear, transformers and lines if electrical power is to provide useful power to the electrical loads. The real power does the work at the load, whereas the reactive power is needed to magnetize the motors or transformer coils for them to be able to operate. However, it is undesirable for too large an amount of reactive power to be used due to the unfavorable utility rate structures, additional losses and voltage drop that is introduced.

Attempts to deal with this problem have involved introducing capacitive loads to the generative power which in effect cancels the inductive loads to an extent, to thereby keep the reactive power within tolerable limits. However, the value of the reactive power changes over time and attempts to introduce the compensating capacitive loads in response to this change in reactive power have not been entirely successful.

For example, one prior attempt to compensate for reactive power has been to measure current polarity and magnitude at the point where the voltage crosses a zero value and is at a positive slope. A negative polarity of the current indicates inductive current whereas a positive polarity of current indicates capacitive current. A zero value indicates zero phase shift and zero reactive power. However, this method has its limitations since it does not operate properly with some kinds of wave form distortion, notably with the kind that is caused by modern silicon controlled rectifiers (SCRs) in phase control modes. Also, this method assumes that the line voltage is constant, which is not always the case.

Another attempt to deal with this compensation problem involves the use of an electromechanical sensor essentially similar to the arrangement used inside a kilowatt-hour meter. In such a device, the rotation of a disk is limited, being spring loaded to a center position. Movement of the disk out of the center position activates one of two switches, depending upon the direction of movement. These switches act either to increase or decrease the number of capacitors hooked into the power network to control the reactive power. However, even though this system has improved response to distorted wave shapes, it is complicated, has many moving parts, is fragile and expensive and often needs to be specially designed and/or produced to specifications.

It would thus be useful to have an apparatus to control the number of correction capacitors to be hooked into an electrical power network for controlling the amount of reactive power which could respond accurately to distorted wave forms caused by silicon controlled rectifiers. Further, it is desirable that such a device have simplicity of operation, few or no moving parts and can be generally adapted with little or no modification to existing power networks.

Summary of the Invention

In accordance with the present invention, an electronic reactive power regulator controls an array of correction components, each component being one of a capacitor or reactor connected to an electrical power network to thereby regulate the amount of reactive power.

The regulator comprises a measuring circuit which includes at least one multiplier circuit which receives at least two input signals, one signal being in phase with the voltage between two lines of a three-line electrical power network and the other input signal being in phase with the current in the third line of the electrical power network. The phase shift between these two input signals is initially 90 degrees when the reactive power is zero, but this phase shift value changes in response to the amount of reactive power in the electrical power network caused by reactive loads. This multiplier circuit produces an output signal whose DC component varies in response to the amplitudes and phase shift between the two input signals. A filtering circuit filters out this DC component and compares it to upper and lower reference limits. An increase control signal is produced by a comparator if the upper limit is exceeded and a decrease control signal is produced if the lower limit is exceeded.

A logic circuit responsive to the control signals selectively increases or decreases the number of correction capacitors or reactors in the electrical power network in response to the control signals, and thereby regulates the amount of reactive power in the electrical network. The correction capacitors or reactors have different values, and the logic circuitry connects or disconnects, in response to the control signals, the one of lowest value in a bank of available capacitors or reactors not already connected or disconnected, respectively.

The regulator can be used to adjust the number of correction capacitors or reactors in response to the production of one type of control signal. The reference limit can be a minimum limit (upper or lower threshold).

A method of adjusting the level of actual reactive power is provided wherein the level of actual reactive power is ascertained and compared to the desired level of reactive power. An increase control signal is generated in response to the level of reactive power being greater than the level of the desired reactive power and a decrease control signal is generated in response to the reverse condition. The desired level of reactive power may comprise a range of values and thus is not necessarily limited to a single point value.

The control signal generated is individually and sequentially applied to switching devices, each of which is associated with and controls the connection of a different value capacitor or reactor into or out of the network. Each switching device has at least two states, one state being indicative of its associated capacitor or reactor being disconnected and the second state indicative of its associated capacitor or reactor being connected. When an increase control signal is applied to a device in the first state or a decrease control signal is applied to a device in its second state, an unfavorable comparison exists and the device changes state from first state to second state or vice versa.

The control signal is applied to the switching devices starting with the switching device associated with the lowest value capacitor or reactor and continuing in the order in which the values of the capacitors or reactors associated therewith increase. The control signal is continually applied until the control signal type (increase or decrease) compares unfavorably with the state of the switching device.

Even though a switching of states of a switching device has occurred, this switching of states may have caused the relationship of actual reactive power to desired reactive power to be reversed, indicating a need for state switching in the other direction. Due to this reversal situation, the steps described above are repeated until the difference between the levels (actual reactive power level and desired reactive power level) exceeds a predetermined value. Preferably the predetermined value is equal to the reactive power compensation provided by the lowest value capacitor or reactor in the array of capacitors or reactors. In the preferred embodiment wherein the capacitors or reactors have relative values of 1:2:4:4:4, the predetermined value is equal to the reactive power compensation provided by the 1-value unit capacitor or reactor.

Thus when the level of reactive power is overcompensated or undercompensated, a mixed sequence occurs, i.e., both types of control signals are alternatively produced.

BRIEF DESCRIPTION OF THE DRAWING

In the accompanying drawing.

DETAILED DESCRIPTION OF THE PREFERRED EMBODIMENT

In electrical power networks having reactive power components, the real power component P and the reactive power component Q are given by the two equations:

$$P = V I \cos \phi$$

$$Q = V I \sin \phi.$$

When measuring the reactive power components the trigonometric formula $$\sin \phi = \cos (90° - \phi)$$

can be substituted in the above equation for $\sin \phi$ to obtain the relation:

$$Q = V I \cos (90° - \phi).$$

This formula is useful since we can obtain, through a three-line electrical power network, two signals which are 90 degrees out of phase when the reactive power is zero. For three phase systems, the V measurement is the voltage between any two lines of the three-line network and the I component is the current in the third line of the three line network.

Figure 3:
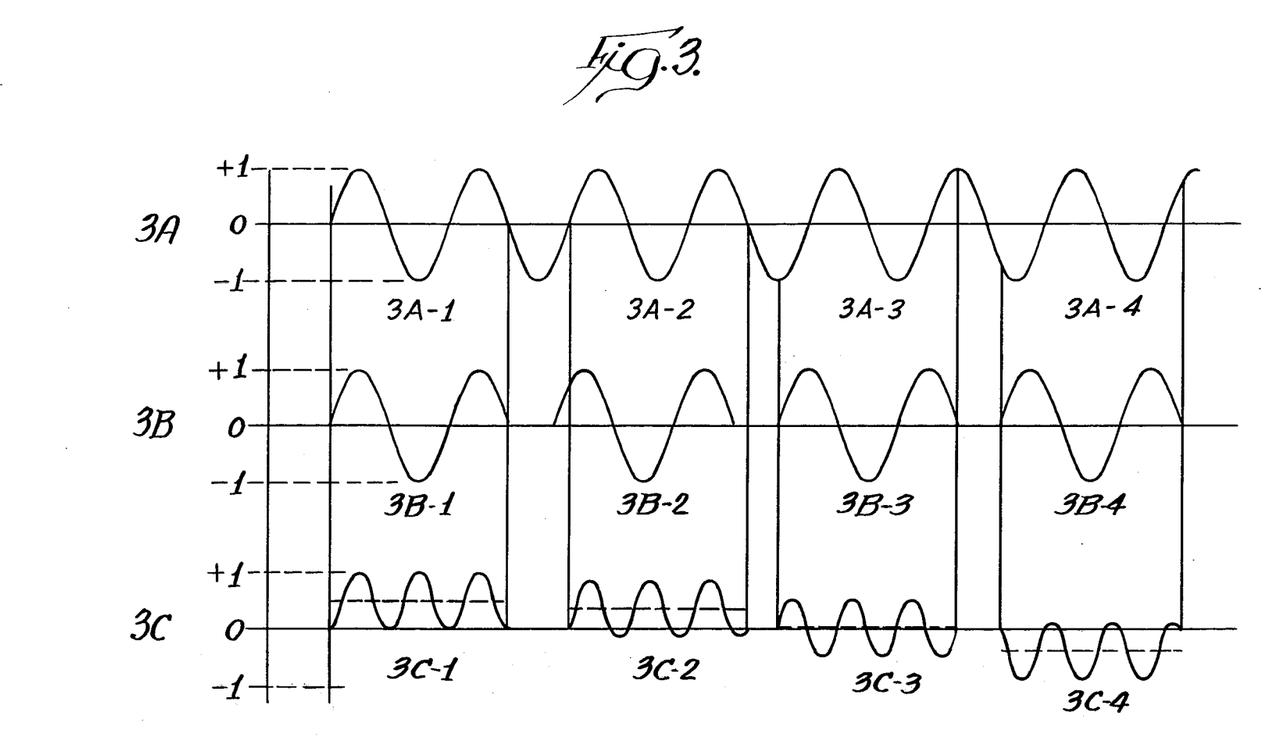
FIG. 3 shows representative input signals and output signals of one of the multiplier circuits of the instant invention.

For a three phase electrical network, multiplier circuits can receive V and I signals as inputs and give an output whose DC component value represents the amplitudes and the phase shift between the V and I signals. This multiplier is merely a device which applies the vector dot product rule to two inputs. Its function can be explained with reference to FIG. 3. The first line in FIG. 3, FIG. 3A, can represent a sinusoidal wave form of the input signal I. FIG. 3B represents four different input signals in varying phase relation to the signal shown in FIG. 3A. FIG. 3B-1 has a wave form with a phase shift of zero degrees with respect to the wave form in FIG. 3A, the wave form in FIG. 3B-2 has a phase angle of 45 degrees, the wave form in FIG. 3B-3 has a phase angle of 90 degrees, and the wave form in FIG. 3B-4 has a phase angle of 135 degrees with respect to the wave form in FIG. 3A.

The wave forms in FIG. 3C represent the wave forms obtained at the output when the wave form in FIGS. 3A and 3B are inputted to an analog multiplier applying the aforementioned dot product rule. In applying the dot product rule, it is understood that the product of a positive and negative quantity is negative, while the product of a positive and positive quantity and the product of a negative and negative quantity are both positive. Therefore, taking each value of the wave form shown in 3A and multiplying it by the value of the wave form shown in 3B will yield the results in FIG. 3C.

As shown in FIG. 3, with two unity amplitude sinusoidal inputs of the same frequency, i.e., those of FIGS. 3A and 3B, the output of a multiplier is a sinusoidal figure of double frequency with a zero frequency (D.C.) offset whose magnitude depends on the phase shift between the two input signals. This zero frequency offset is a DC signal component shown by the dotted horizontal lines in the FIG. 3C in each of the four resultant wave forms.

Thus, a wave form of FIG. 3B-1 which has a phase angle of zero with respect to the other input signal of 3A will yield an output signal with a DC offset of 0.5 of the input amplitude (for input signals having a unity amplitude), the maximum possible value. With a phase angle input differential of 45 degrees, the DC offset output is about 0.35 of the input amplitudes as shown in FIG. 3C-2. Further, a phase angle of 90 degrees between the two input signals will yield no DC offset as shown in FIG. 3C-3 and a phase angle of 135 degrees between the two input signals will yield a DC offset output signal of $-0.35$ of the input amplitudes.

As will be explained below, this DC offset characteristic of the output signal can be extracted from the output signal of the multiplier by passing the signal through a low pass filter and because it indicates the phase angle of the two input signals, it can be used as a control signal to connect or disconnect corrective capacitors to the network and thereby adjust the reactive power value Q which will in turn result in changing the phase angle value between the two input signals V and I.

Figure 1:
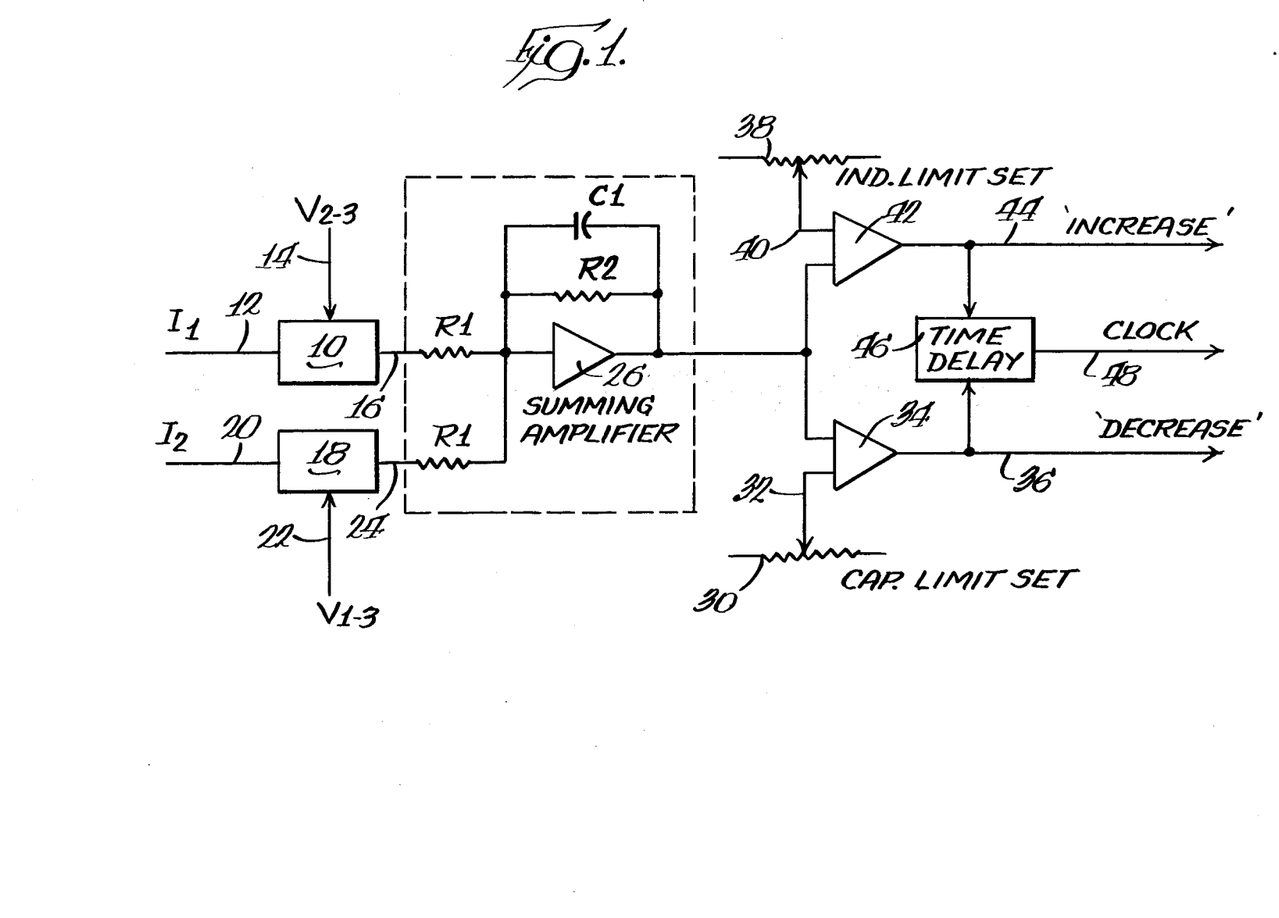
FIG. 1 is an electrical schematic showing the control circuit of the instant invention.

Referring to the control circuit of FIG. 1, a multiplier circuit 10 is shown receiving input value 12, a signal which represents the current, I1 in one line of a three line electrical network. The multiplier also receives signal 14 which is a signal proportional to the difference in voltages between the other two lines of a three line electrical network, V2-3. The signal outputted at 16 will be a signal like that shown in FIG. 3C. For symmetrical three phase electrical systems, only one such multiplier is needed since one phase angle measurement is sufficient to adequately describe or represent the reactive power in the system. For a non-symmetrical 3-phase system, to characterize the conditions, a second multiplier 18 is needed which receives the current I2 indicated by reference numeral 20 in a second line and a voltage V1-3 which represents the voltage between the first and third lines as indicated by reference numeral 22. This multiplier 18 produces an output signal at 24 similar to the output signal from the first multiplier at 16.

For a non-symmetrical network with a return wire, three such multiplier circuits are needed. The inputs would be I3 and V1-2, inputted to a third multiplier not shown in FIG. 1. For single phase systems, a phase angle compensation circuit is needed as will be described below.

Each input signal to a multiplier is 90° out of phase to the other input signal to the same multiplier when the reactive power is zero, but the phase angle changes in response to reactive power changes.

The two multiplier output signals 16 and 24 each pass through input resistors R1 and are then summed by a suitably scaled operational amplifier 26. If a third multiplier is used, the output of this multiplier would also be fed through a resistor R1 and would also be inputted to the summing operational amplifier 26. The feedback loop of the operational amplifier contains a resistor R2 and capacitor C1 which together comprise a low pass filter to extract the DC component of the input signals so that only the DC component, or a proportion thereof, of the signals present at 16 and 24 will appear at the output of the operational amplifier 26 at line 28. The magnitude of the signal appearing at 28 is thus indicative of the phase angle and each amplitude and thus the amount of reactive power appearing in the electrical network.

The output signal 28 is then compared to two reference limits, which are also DC voltages which represent a lower reactive power limit and an upper reactive power limit. The upper reactive power limit may be called the inductive limit and the lower reactive power limit may be called the capacitive power limit. The lower reactive power limit can be varied by adjusting the variable resistor 30 to give a set DC threshold signal at input 32 of a voltage comparator 34. When the DC signal at line 28 drops below the DC signal at line 32, thereby indicating a low amount of reactive power that can be compensated by disconnecting a correction capacitor, the voltage comparator 34 produces a decrease high logic signal at output 36 which is used to trigger a logic circuit to decrease the number of correction capacitors or reactors connected to the electrical power network, as will be described more fully below.

The upper reactive power limit can be varied by adjusting the variable resistor 38 to give a set DC threshold signal at input 40 of voltage comparator 42. When the DC signal at line 28 goes above the DC signal at line 40, thus indicating a high amount of reactive power that needs to be compensated by the introduction of correction capacitors, the voltage comparator 42 outputs an increase high logic signal at output 44. This increase high logic signal is used to trigger the logic circuit to introduce more capacitors into the electrical power network, as will be more fully described below.

Outputs 36 and 44 of the voltage comparators are also connected to a time delay clock 46 which outputs a high logic enable signal when one of the inputs 36 or 44 to it remains at a high logic level for a certain time period, preferably between 10 to 30 seconds. The output 48 of this time delay clock is also used to trigger the logic circuit as will be more fully described below, and is primarily used to insulate the logic circuitry from transients which might trigger the logic circuitry into increasing or decreasing the number of correction capacitors when such switching is not required. Thus, unless a high logic signal appears at line 36 or 44 for the specified time period, a clock pulse will not appear at output 48. This clock in effect delays the response of the logic means to the control signals. However, the regulator does not need the delay clock to operate, as the JK flip-flop could be provided with connections to be directly and immediately responsive to the control signals.

Figure 2A:
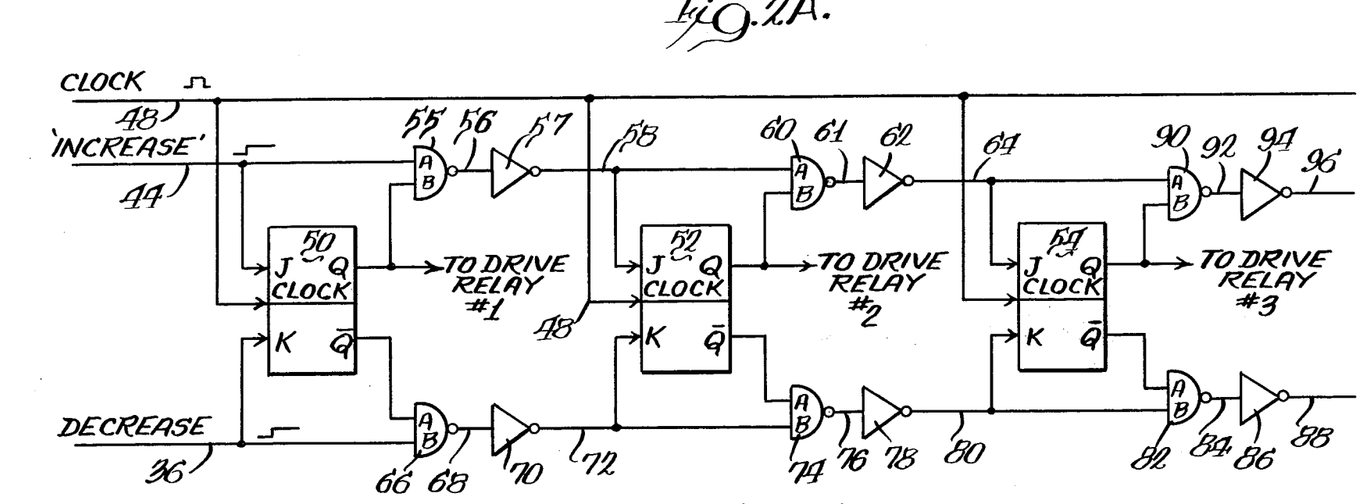
FIGS. 2A and 2B are schematic of the circuitry of the instant invention.

Referring now to FIG. 2a, the logic circuitry to connect and disconnect a power factor correction means, i.e., an array of capacitors or reactors, will now be more fully explained.

Generally, the logic circuitry comprises a series of serially cascaded J-K flip-flops 50, 52, 54, and so on, if more steps are desired. The flip-flops are bi-stable switching devices having two stable states, but a monostable switching device could be used. The device is preferably capable of assuming one of two states, depending on the input conditions. Each of the flip-flops is connected to trigger the connection of a correction capacitor or reactor when its Q output is flipped to a high logic state. When the Q output of a flip-flop is flipped to a low logic state, the correction capacitor or reactor associated with that flip-flop is then disconnected. This can be achieved by a drive relay or other suitable device known to those skilled in the art.

Preferably, the correction capacitors or reactors have different values and are associated with the flip-flops so that the lowest value capacitor or reactor is associated with the first flip-flop 50, the second lowest value capacitor or reactor is associated with the flip-flop 52, and so on. Thus, the highest value capacitor reactor will be connected to the last flip-flop in the chain of cascaded flip-flops. This arrangement is for the purpose of engaging only the lowest value capacitor or reactor not already engaged or connected into the circuit when an increase control signal appears on line 44, and for disengaging or disconnecting the lowest value capacitor or reactor not already disengaged when a decrease control signal appears on line 36.

When, for example, none of the correction capacitors or reactors are connected to the electrical power network, all of the Q outputs are in the low logic state. Thus, all of the inverse Q outputs are in the high logic state and all of the J, K and CLOCK inputs are all in the low logic state.

As the reactive power increases to indicate a need for the connection of correction capacitors or reactors, an increase high logic signal will appear on line 44 and this high logic signal will be inputted to the J input of flip-flop 50. After a specified time period, the time delay clock 46 will output a high logic signal on clock line 48 into the CLOCK input of flip-flop 50. This will cause the Q output of flip-flop 50 to go high and will energize a relay or other suitable device to connect the lowest value capacitor or reactor into the electrical network, said lowest valve capacitor or reactor being associated with the first flip-flop 50.

This high logic signal at the Q output of flip-flop 50 will also be inputted to the B input of a NAND gate 55. This high logic signal will continually appear at the B input of the NAND gate 55 as long as the correction capacitor or reactor triggered by the Q output of flip-flop 50 is connected.

If this does not serve to adequately compensate the increase in reactive power, or the reactive power later increases, the control circuit of FIG. 1 will produce another increase high logic signal on line 44. This high logic signal on line 44 will not change the state of the flip-flop 50, since input J thereof is already in the high logic state. However, it will be inputted into the A input of NAND gate 55 which will produce a low logic signal at line 56. This will be inverted by inverter 57 which will output a high logic signal at line 58 which will be inputted into the J input of flip-flop 52. When the specified time period has elapsed so that time delay clock 46 produces another clock pulse 48, CLOCK input of flip-flop 52 will receive a high logic signal and a high logic signal will thus appear at the Q output of flip-flop 52. This will trigger a relay to engage or connect into the electrical power network the second lowest value correction capacitor or reactor.

High output signal at the Q output of flip-flop 52 will also be inputted into the B input of NAND gate 60. If the engagement of this second correction capacitor or reactor associated with flip-flop 52 does not result in removal of this increase control signal, or if the reactive power increases later to thereby produce another increase control signal on line 44, a high input logic signal will appear at line 44 at the A input to NAND gate 55 and at the A input to NAND gate 60. Since both the A and B inputs to NAND gate 60 are high, the output 61 will be low and inverter 62 will cause a high logic signal to appear at line 64 to be inputted into the J input of flip-flop 54.

If after a certain time period a clock pulse is produced, the Q output of flip-flop 52 will go high and the third lowest correction capacitor or reactor will be engaged. Additional high logic signals appearing on the increase line 44 and on the clock line 48 will cause more and more of the correction capacitors or reactors, associated with flip-flops to the right in FIG. 2a, to be engaged or connected into the electrical network, as needed.

The above described switching sequence is an example of a single sequence because only one type of control signal, i.e., increase control signals, are produced in regulating the reactive power. Single sequence switching is also involved when only decrease control signals are produced in regulating the reactive power, as will be described immediately below. The amount of reactive power will, in some situations, require a mixed sequence, i.e., a combination of increase and decrease control signals. This mixed sequence will be described more fully below after the description of the single decrease sequences.

When all three correction capacitors or reactors of flip-flops 50, 52 and 54 are engaged or connected into electrical network and the reactive power drops causing a high logic signal to appear on the decrease line 36. Then the K input to flip-flop 50 will go high, and after a certain period of time a clock pulse will appear at the clock input to flip-flop 50 and since no high logic signal appears on increase line 44, the J input to flip-flop 50 will be at a low logic state. This will cause the Q output of flip-flop 50 to go low, thereby disengaging or disconnecting the lowest value capacitor or reactor in the network. Also, the inverse Q output of flip-flop 50 will go high and thus a high input signal will appear at the A input to NAND gate 66.

If this disconnection is not enough to increase the reactive power in the electrical network, a high logic signal will appear on the decrease control line 36 to be inputted into the B input of NAND gate 66. This, in turn, will cause a low logic signal to appear at the NAND gate output 68 and will be inverted by inverter 70 to provide a high logic output on line 72.

If the correction capacitor associated with flip-flop 52 is connected and if the Q output of flip-flop 52 is high, then this decrease signal appearing at connection 72 and at the K input to flip-flop 52 will cause this particular correction capacitor to disconnect due to the combination of the CLOCK input and the K input going high, causing the Q output to go low. Also, the inverse Q output will go high thus inputting a high logic signal into the A input of NAND gate 74.

Additional decrease high logic signals will cause the B input to NAND gate 74 to go high which, in turn, will cause line 76 to go low. Inverter 78 will invert this low signal so that a high logic signal appears on line 80. If the decrease signal still remains so that a clock signal appears on the CLOCK input to flip-flop 54, this flip-flop will function in like manner to flip-flop 52 just described to disconnect the correction capacitor or reactor associated with flip-flop 54. If still further disconnection is required and correction capacitors further on down the line are still connected, appropriate signals will appear at NAND gate 82, line 84 and inverter 86 so that line 88 will have a high logic signal to drive the K input of a next flip-flop not shown in FIG. 2a.

Similarly, if all of the correction capacitors associated with flip-flops 50, 52 and 54 are already connected and engaged, suitable input signals will appear at NAND gate 90, line 92, inverter 94 and line 96 which is fed into the J input of a next J-K flip-flop not shown in FIG. 2. NAND gate 90 and inverter 94 function in like manner to NAND gate 60 and inverter 62 respectively.

Due to the characteristics of the JK flip-flops, the J and K inputs can be reversed and the Q and inverse Q outputs can be reversed. Suitable alterations, such as inverters or other means known to those skilled in the art, might have to be made to the circuit.

Thus the net effect of the logic circuitry of FIG. 2a is for any high input control signal appearing at decrease line 36 or increase line 44 to respectively disconnect or connect the lowest value capacitor connected in the network or available in the bank, respectively. The bank of capacitors or reactors comprises capacitors, or reactors not already connected in the network.

As described above, connecting (or disconnecting) the lowest value capacitor or reactor to the network (or from the network) might not be enough to regulate the reactive power, and thus additional increase (or decrease) control signals will be provided by the comparison circuit to connect (or disconnect) additional capacitors or reactors. This occurs because of the negative feedback loop in the system, wherein the amount or level of reactive power is continually being measured and compared to reference limits, indicative of the level of desired reactive power.

In the same way, the reactive power regulator, through the feedback loop, provides a certain mixed sequence switching scheme, for adjusting the number of capacitors or reactors connected to the network if the lowest value capacitor or reactor switched in or out of the network causes the reactive power to be overshot.

Mixed sequence switching occurs whenever a switching of a capacitor or reactor in or out of the network causes the actual resultant reactive power to overshoot or undershoot the desired reactive power, i.e., when too much compensation has taken place. When this occurs, a mixture of increase and decrease control signals are produced. This situation is best described by way of example, which will proceed below.

In a typical network using four capacitors or reactor components having relative values of 1:2:4:4 with the first or lowest three value components connected, a total of 7 unit values, (i.e. 1+2+4) of reactive power compensation are provided. When the electrical network conditions change to call for a total of 9 unit values to be connected, an increase control signal is produced. This increase signal causes the last 4 unit value component to be connected, resulting in a total of 11 units of compensation connected (i.e., 1+2+4+4). Then, because there is too much compensation, a decrease control signal is produced, causing the lowest value component, i.e., the 1-value component, to be disconnected, leaving a total of 10 units connected (2+4+4). This still results in an overshoot condition, as there is still too much compensation, so another decrease control signal is produced. In response to this particular decrease control signal, the lowest value component connected, the 2-value component is disconnected, resulting in a total of 8 units connected (4+4), and yielding an undershoot condition. An increase control signal is then produced in response to the undershoot condition, and the lowest value component available for connection, the 1-value component, is connected, yielding a total of 9 units connected, (1+4+4), the desired number.

Each switching operation occurs well within a one second period, once the increase control signal and clock signal appears. The time period between successive switching operations is determined, at least in part, by the time period of the time delay clock 46, which does not produce a clock pulse on line 48 until a certain period of time has elapsed after receiving a signal on either one of lines 36 or 44. This delay period is predetermined, and has a value preferably between 10 and 30 seconds, so that the fastest possible time between successive switching is the predetermined delay period.

Preferably, the correction capacitors or reactors have unequal values, and are thus graded, in an array of increasing values with the lowest value capacitor or reactor situated first in the array. Even more preferably, the correction capacitors are chosen so that their values are with relative magnitudes 1:2:4, etc., so that each capacitor or reactor has a value equal to one-half the value of the capacitor adjacent after it in the chain and twice the value of the capacitor adjacent before it in the chain cascade of flip-flops. This scheme allows for a high resolution while minimizing the numbers of capacitors necessary to attain this resolution. Thus, with an N number capacitors of equal value, only a resolution of 1/N can be achieved, whereas with the present scheme used, an N number of capacitors can provide a resolution of $1/(2^N-1)$ if implemented to the full extent. To put it another way, if three or more capacitors are used, at least some of the capacitors should have unequal values, preferably so that an intermediate value capacitor or reactor has a value equal to one-half and twice the value of the capacitors or reactors adjacent thereto.

Due to practical limitations and to reduce the number of connection of disconnection operations when a relatively large value capacitor is switched on or off, the relative values preferably are 1:2:4:4:4 if five steps are used. This provides a resolution of 1/15, which is usually sufficient for most practical applications, utilizing an array in one portion of which the relative capacitor or reactor value is doubled with each consecutive capacitor or reactor and in another portion of which the capacitors or reactors have equal values.

Figure 2B:
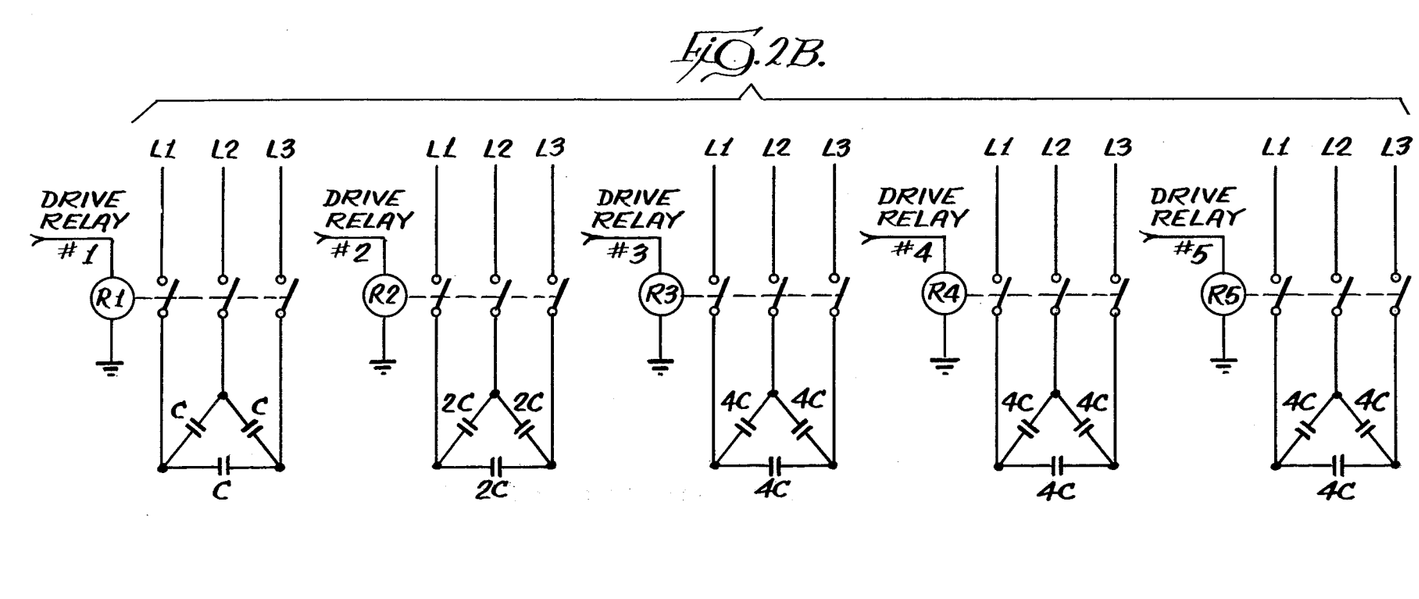

FIG. 2B shows a capacitor array having relative values described above. The first portion of the bank is associated with flip flop 50 of FIG. 2A. A drive relay or switching mechanism R1, when energized will cause the capacitors C to be connected in delta to the three line network of L1, L2 and L3. The switching mechanism R1 will be energized when the Q output of flip flop 50 is at a high logic level. Drive relays or switching mechanisms R2, R3, R4 and R5 operate in a similar manner. Of course FIG. 2A only shows the logic circuitry for the first three steps i.e. flips flops 50, 52 and 54. Two more steps of flip flops could be provided, but have been omitted from FIG. 2A to avoid duplication. These last two steps of flip flops would of course be connected to drive relays or switching mechanisms R4 and R5.

For single phase networks, taking I1 and V1-0 as input signals will not give an initial phase angle of 90°. However, the circuit of FIG. 4, an all-pass filter, provides a phase shift circuit means for shifting the angle of an input signal by 90°, or any other angle. The circuit receives a line signal in phase with one of the voltage or current and produces an output signal 90° out of phase from the line signal so received. The output signal thereof can then be fed into one input of the multiplier and this signal will be 90° out of phase with the other of the voltage or current signal which is fed directly into the other input of the multiplier. If the frequency varies, the phase shift value will vary from 90°, but this phase shift variance is less than 0.6 degrees for a power line frequency held to within 1%.

Figure 4:
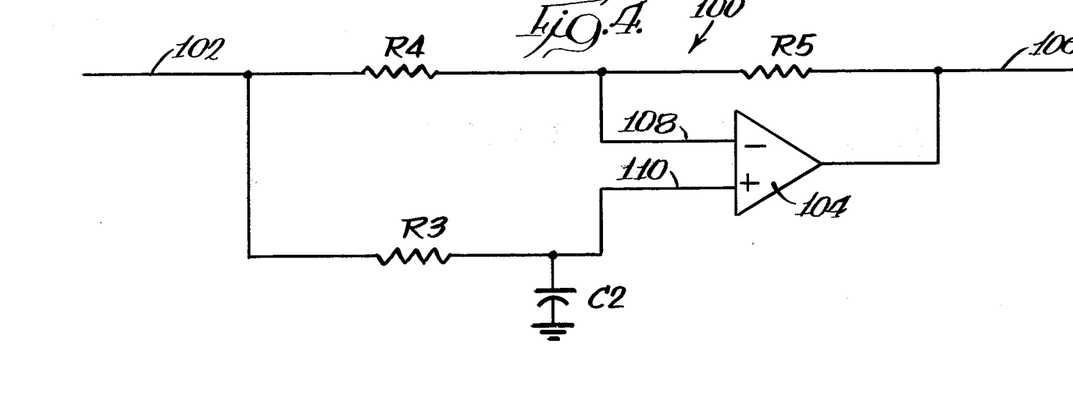
FIG. 4 is a schematic showing a phase shifting network for use in single-phase networks.

The circuit 100 of FIG. 4 comprises line signal input 102, resistors R3, R4 and R5, capacitor C2, operational amplifier 104 and output signal line 106. Operational amplifier amplifies any voltage difference between lines 108 and 110. The amplified output signal is fed back through R5 until a balance is restored between lines 108 and 110.

R3 and C2 are chosen depending on the constant frequency of the system (e.g., 50 or 60Hz usually) so that $(R3)(C2)=1/2\pi f$, giving (R3)(C2)=3.18 milliseconds for f=50Hz and (R3)(C2)=2.65 milliseconds for f=60Hz. For f=50Hz, values of R3=12.8K, R4=R5=26.7K and C2=249nF have proved satisfactory.

From the foregoing, it will be observed that numerous variations and modifications may be effected without departing from the true spirit and scope of the novel spirit of the invention. It is to be understood that no limitation with respect to the specific apparatus illustrated here is intended or should be inferred. It is, of course, intended to cover by the appended claims all such modifications as fall within the scope of the claims.

What is claimed:

1. A reactive power regulator maintaining the reactive power level in an electrical power network by adjusting the number of correction capacitors or reactors connected into the power network, which comprises:

measuring means for measuring the reactive power in the power network comprising at least one multiplier circuit means for receiving from said network at least two input signals having an initial relative phase shift value of 90 degrees when the reactive power is zero but which changes in response to a change in reactive power, and for producing in response to the received input signals an output signal having a characteristic indicative of the existing reactive power;

control signal generating means for comparing said characteristic to reference limits and for producing an increase control signal when one limit is exceeded and a decrease control signal when another limit is exceeded; and logic means, responsive to said control signals, for selectively incrementally adjusting the number of unequal value correction capacitors or reactors in the electrical power network in response to said control signals by disconnecting the lowest value capacitor or reactor from the network in response to a decrease control signal, and by connecting the lowest value unconnected capacitor or reactor into the network in response to an increase control signal, to thereby regulate the amount of reactive power.

2. The reactive power regulator of claim 1 wherein said control signal generating means compares said characteristic to a lower reference limit and to an upper limit and produces an increase control signal when said upper limit is exceeded and a decrease control signal when said lower limit is exceeded, and wherein said logic means incrementally increases the number of correction capacitors or reactors in the electrical network in response to an increase control signal and incrementally decreases the number of correction capacitors or reactors to the electrical network in response to a decrease control signal.

3. The reactive power regulator of claim 1 wherein said signal characteristic is the D.C. amplitude of said output signal.

4. The reactive power regulator of claim 2 wherein adjustment means are provided for adjusting the upper and lower reference limits.

5. The reactive power regulator of claim 2 wherein delay means are provided for delaying the response of the logic means to said control signals.

6. The reactive power regulator of claim 1 wherein at least three correction capacitors or reactors having unequal graded values are present and are arranged in an array of consecutively increasing capacitor or reactor value.

7. The reactive power regulator of claim 1 wherein a plurality of correction capacitors or reactors is present and the capacitors or reactors are arranged in an array in which a first portion is constituted by capacitors or reactors of consecutively increasing values and a second portion is constituted by capacitors or reactors of equal values.

8. The reactive power regulator of claim 7 wherein in said first array portion the value of each consecutive capacitor or reactor is twice the value of the immediately preceeding capacitor or reactor.

9. The reactive power regulator of claim 7 wherein in said second array portion the value of each capacitor or reactor is equal to the highest value of a capacitor or reactor present in said first array portion.

10. The reactive power regulator of claim 1 wherein the array is constituted by five capacitors or reactors having relative values in the proportion 1:2:4:4:4, respectively.

11. The reactive power regulator of claim 2 wherein at least three correction capacitors or reactors of unequal graded values are present and are arranged in one array providing consecutively graded unit values of reactive power compensation when connected into said network.

12. The reactive power regulator of claim 2 wherein at least three correction capacitors or reactors of unequal values are present and are arranged so that an intermediate value capacitor or reactor has a value approximately equal to one-half and twice the value of the largest and smallest value capacitor or reactor.

13. The reactive power regulator of claim 12 wherein the logic means has means for disconnecting, in response to said decrease control signal, the lowest value capacitor or reactor in said network.

14. The reactive power regulator of claim 12 wherein the logic means has means for connecting from a bank of capacitors or reactors, in response to said increase control signal, the lowest value capacitor or reactor available.

15. The reactive power regulator of claim 6 wherein the logic means includes an array of switching devices responsive to the control signals, each said device associated with a different capacitor or reactor and having a first state indicative of the capacitor or reactor being disconnected and a second state indicative of the capacitor or reactor being connected, wherein the device associated with the lowest value capacitor or reactor not connected into the network changes state in response to an increase control signal and wherein the device associated with the lowest capacitor or reactor connected into the network changes state in response to a decrease control signal.

16. The reactive power regulator of claim 2 wherein one of said two input signals is in phase with the voltage between two lines of a three-line electrical power network and wherein the other of said two input signals is in phase with the current in the third line to thereby provide an initial phase shift value of 90 degrees between said signals.

17. The reactive power regulator of claim 3 wherein filtering means are provided for extracting the DC component amplitude characteristic from the output signal.

18. The reactive power regulator of claim 2 wherein means are provided for summing said output signals from said multiplier circuit means when more than one multiplier circuit means receives input signals.

19. The reactive power regulator of claim 2, wherein phase shift circuit means are provided for receiving a line signal in phase with one of the voltage or current in a single phase network, and for producing an output signal 90° out of phase from the line signal so received, and providing an input signal to the multiplier circuit means which is 90° out of phase with the other of said voltage or current when the reactive power is zero.

20. A reactive power regulator for controlling a bank of power factor correction capacitors or reactors having different values capable of being connected to a three-line electrical power network to thereby control the amount of the reactive power comprising:

a measuring circuit to measure the reactive power comprising at least one multiplier circuit which receives at least two input signals from said network, one of said two input signals being in phase with the voltage between two lines of said three-line electrical power network and the other input signal being in phase with the current in the third line of said three-line electrical power network to thereby provide an initial phase shift value of 90 degrees between said signals when the reactive power is zero, and producing in response to the received signals an output signal having a DC component indicative of the reactive power;

a filtering circuit which extracts the DC component of the output signal and which produces a filtered output signal proportional to the DC component;

a control signal generating circuit which compares the filtered output signal to lower and upper reference limits and which produces an increase control signal when said upper limit is exceeded and a decrease control signal when said lower limit is exceeded;

a logic circuit which is responsive to said control signals and which selectively disconnects, in response to a decrease control signal, the lowest value capacitor or reactor available in said network, and which selectively connects, in response to an increase control signal, the lowest value capacitor or reactor available from said bank, to thereby regulate the reactive power and keep the filtered output signal between said lower and upper reference limits.

21. The reactive power regulator of claim 20 wherein an adjustment circuit is provided for adjustment of the upper and lower reference limits.

22. The reactive power regulator of claim 20 wherein a delay clock is operably associated with the control signal generating circuit, is responsive to the control signals, and produces an enable clock signal a specified time period after it receives a control signal, and wherein the logic circuit is connected to the delay clock so that the logic circuit disconnects and connects the capacitors or reactors only after it receives an enable clock signal from said delay clock.

23. The reactive power regulator of claim 20 wherein the logic circuit comprises a plurality of serially cascaded flip-flops so that each capacitor or reactor is directly responsive to and associated with a different one of said flip-flops and wherein the flip-flops are cascaded so that each flip-flop receives a control signal only after all of the flip-flops associated with capacitors or reactors having lower values receive a control signal, and before all of the flip-flops associated with capacitors or reactors having higher values receive a control signal, and wherein means are provided for connecting or disconnecting, to the power network, each capacitor or reactor in response to the logic state of its associated flip-flop.

24. The reactive power regulator of claim 23 wherein the flip-flops are J-K flip-flops and wherein connections are provided for feeding increase control signals into the J-input of the first cascaded flip-flop and for feeding decrease control signals into the K-input of the first cascaded flip-flop and wherein each J-input of each successive flip-flop has connection means for being responsive to the Q-output of the preceding flip-flop and wherein each K-input of each successive flip-flop has connection means for being responsive to the inverse Q-output of the preceding flip-flop.

25. The reactive power regulator of claim 22 wherein the flip-flops are J-K flip-flops and wherein connections are provided for feeding increase control signals into the K-input of the first cascaded flip-flop and for feeding decrease control signals into the J-input of the first cascaded flip-flop and wherein each K-input of each successive flip-flop has connection means for being responsive to the inverse Q-output of the preceding flip-flop and wherein each J-input of each successive flip-flop has connection means for being responsive to the Q-output of the preceding flip-flop.

26. The reactive power regulator of claim 23 wherein at least three capacitors or reactors of unequal value are arranged in an array in which an intermediate capacitor or reactor has a value higher than the value of one adjacent capacitor or reactor and lower than the value of the other adjacent capacitor or reactor.

27. The reactive power regulator of claim 23 wherein each capacitor or reactor has a value approximately equal to one-half the value of the capacitor or reactor associated with the cascaded flip-flop immediately after it and approximately equal to twice the value of the capacitor or reactor associated with the cascaded flip-flop immediately before it.

28. A reactive power regulator system for an electrical power network which includes:

an array of unequal value correction capacitors or reactors for connection to said network;

measuring means for measuring the reactive power in the power network comprising at least one multiplier circuit means for receiving from said network at least two input signals having an initial relative phase shift value of 90 degrees when the reactive power is zero but which changes in response to a change in reactive power and for producing in response to the received input signals an output signal having a characteristic indicative of the existing reactive power;

control signal generating means for comparing said characteristic to reference limits and for producing an increase control signal if one limit is exceeded and for producing a decrease control signal if a different limit is exceeded; and logic means, response to said control signals, for selectively incrementally adjusting the number of correction capacitors or reactors in the electrical power network in response to said control signals by disconnecting the lowest value capacitor or reactor from the network in response to a decrease control signal, and by connecting the lowest value unconnected capacitor or reactor into the network in response to an increase control signal, to thereby regulate the amount of reactive power.

29. The reactive power regulator of claim 28 wherein at least three correction capacitors or reactors having unequal values are present and are arranged in a graded array of consecutively increasing capacitor or reactor value.

30. The reactive power regulator of claim 29 wherein the array is constituted by five capacitors or reactors having relative values in the proportion 1:2:4:4:4, respectively.

31. A method for controlling the level of reactive power in an electrical network comprising the steps of providing an array of correction capacitors or reactors having unequal graded values, wherein the connection of each capacitor or reactor is responsive to the state of a switching device and associated therewith;

comparing the actual reactive power to a predetermined level of reactive power;

generating a control signal representative of the difference between said levels; and sequentially applying the control signal to said switching devices in the order of increasing capacitor or reactor values associated therewith, until a switching device changes state.

32. A method as set forth in claim 31 wherein the steps of comparing said levels, generating a control signal, and applying the control signal, are repeated while the difference between said levels exceeds a predetermined value.

33. A method as set forth in claim 32 wherein the predetermined value is substantially equal to the reactive power compensation provided by the lowest value capacitor or reactor.

34. A method as set forth in claim 31 wherein the steps are repeated in a mixed sequence with alternating connection and disconnection of one of a capacitor or reactor.

35. A method as set forth in claim 31 wherein the steps are repeated in a mixed sequence to provide consecutively decreasing increments of compensation.

* * * * *

UNITED STATES PATENT AND TRADEMARK OFFICE
CERTIFICATE OF CORRECTION

PATENT NO. : 4,359,678
DATED : November 16, 1982
INVENTOR(S) : Pertti Raivola; Bo Wikstrom; Pellervo Kaskinen It is certified that error appears in the above-identified patent and that said Letters Patent are hereby corrected as shown below:

lease add the following to the left column of the title page:

-- Assignee: Merrick Engineering, Inc.
             Nasville, Tenn. --.

Signed and Sealed this

Eighth Day of February 1983

[SEAL]

Attest:

Attesting Officer

GERALD J. MOSSINGHOFF

Commissioner of Patents and Trademarks